INVENTOR.
GEORGE A. MOORE
JACK W. JENNINGS
BY
*John H. Wilkinson*
ATTORNEY

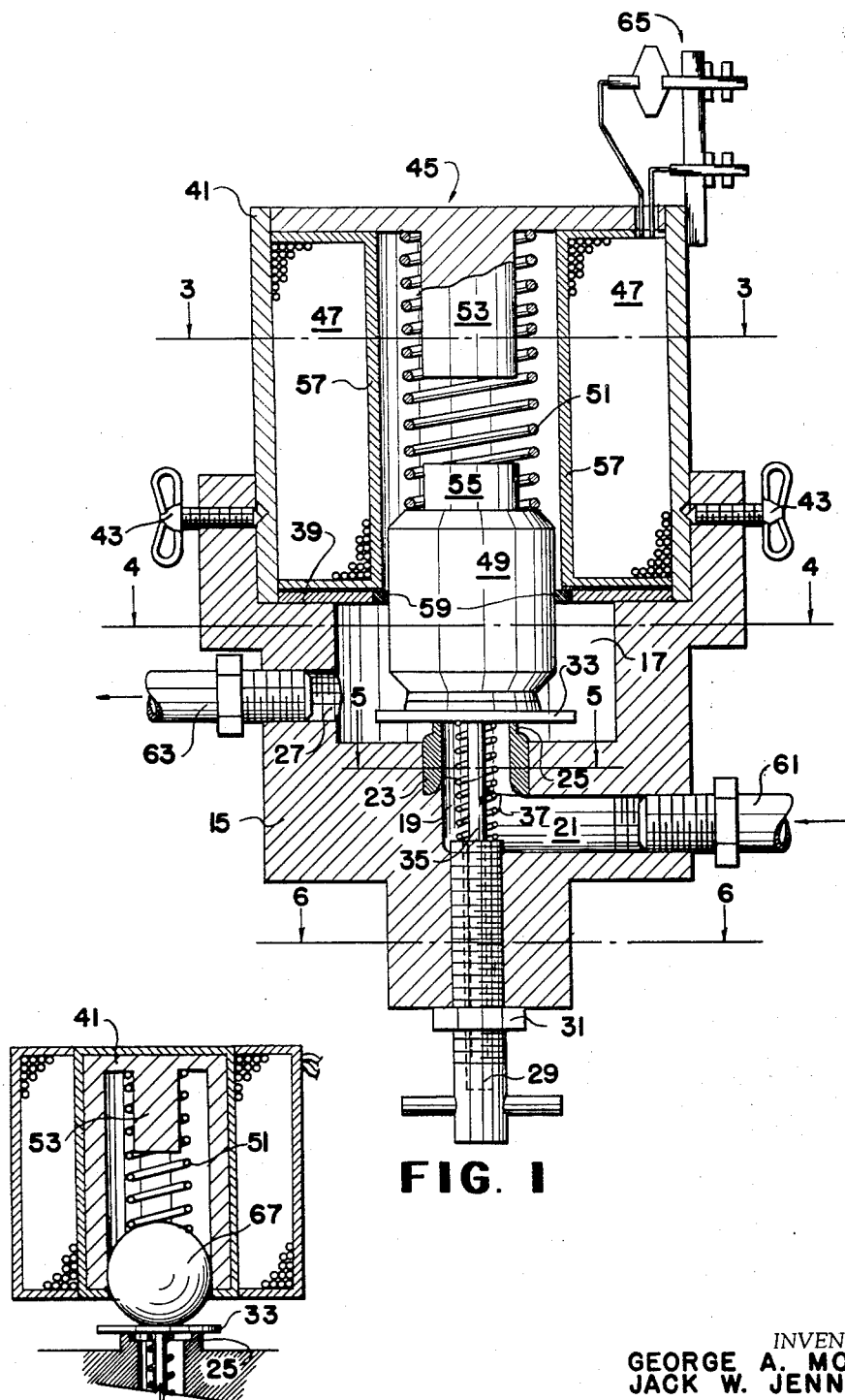

United States Patent Office 3,421,546
Patented Jan. 14, 1969

---

3,421,546
PRESSURE RELEASE VALVE
Jack W. Jennings, 5403 E. Kellogg, Wichita, Kans. 67218,
and George A. Moore, 843 N. Dellrose, Wichita, Kans.
67208
Filed July 16, 1965, Ser. No. 472,440
U.S. Cl. 137—523                                    4 Claims
Int. Cl. F16k 21/04; F16k 15/04; F16k 31/02

ABSTRACT OF THE DISCLOSURE

This invention relates to a solenoid actuator pressure release valve having a main housing with inlet and outlet conduits, a valve seat in the housing about the inlet conduit, a valve member biased into engagement with the valve seat by opposing spring members, a solenoid member connected to the valve member to open same, and an elongated adjusting screw member adapted to regulate the pressure of one spring member against the valve member so that the valve member acts as a safety means on opening at certain pre-set pressures or may be opened by the solenoid member.

---

This invention relates to a valve, more particularly to a pressure release valve. In a more specific aspect, this invention relates to a pressure release valve which can be actuated by a solenoid, and still more particularly this invention relates to a spring mounted pressure release valve which can be released by fluid pressure acting against spring tension and by the action of a solenoid.

Pressure release valves are well known in the art. Valves of this type are in common use in connection with practically all types of pressure vessels in which application they are employed as safety valves to be actuated by an excessive pressure over the safety limits of the vessel. These valves are ordinarily adjustably spring loaded and are well known. In many instances it is found desirable to maintain a controlled working pressure in a vessel by use of a regulating valve. Such valves are also well known to the art and are of many types. A less common usage of a pressure release valve is encountered where it is desirable to release pressure on a vessel automatically and rapidly such as at the end of a timed cycle. This combination of requirements has been found in the use of pressure vessels for cooking food. However, the prior art does not reflect a simple valve embodying all of these requirements. Of necessity, a valve of this type when used in connection with a cooking vessel should be easily cleanable and of such construction that solids intermingled with the fluids contained in the vessel will not hamper the effective release of the valve when desired or necessary.

We have invented a new pressure release valve that has an electric solenoid means mounted on a housing means. The solenoid means is connected to an electric powering means and is operably connected to a valve means. Inlet and outlet duct means intercommunicate through the valve means, with a resilient means urging the valve means to a closed position. The valve is constructed and adapted to pass fluid under pressure through the duct and valve means with the electric powering means supplying power to actuate the solenoid means to open the valve and let the fluid pass therethrough.

We have invented a combination valve which overcomes the disadvantages in the prior art. The valve of our invention is first a safety valve which can be actuated by excessive pressures of the fluid being exerted upon the valve and causing it to lift from its seat against the tension of a spring. By this same action a controlled pressure can be maintained in a vessel. In addition, however, our valve is so designed that all pressure can be relieved from the vessel by electrically opening the valve with a solenoid. This arrangement is particularly useful when used in connection and combination with a cooking timing device that will electrically energize the valve at the end of a pre-determined cooking cycle. In this respect our valve is particularly applicable to automatic pressure deep-fat frying machines and the ilke but is in no way restricted to this use. As will be apparent to those skilled in the art, our multi-purpose valve can have many other applications on other types of pressure systems as well as on vacuum systems.

It is an object of this invention to provide a new pressure release valve.

It is another object of this invention to provide a new pressure release valve electrically operated by a solenoid.

Still another object of this invention is to provide a new pressure release valve that is a combination safety valve and pressure release valve operated by a solenoid.

An still another object of this invention is to provide a new pressure release valve that is simple in operation and economical to manufacture.

And one more object of this invention is to provide a new pressure release valve that is particularly adapted for use with a pressure cooking vessel.

And yet another object of this invention is to provide a new combination safety, pressure regulating and unloading valve.

Various other objects, advantages, and features of the invention will become apparent to those skilled in the art from reading this disclosure.

Drawings accompany and are a part of this disclosure. These drawings depict preferred specific embodiments of the pressure release valve of the invention, and it is to be understood that these drawings are not to unduly limit the scope of the invention. In the drawings, FIG. 1 is a side elevation view in cross section of a preferred specific embodiment of the valve of the invention.

FIG. 2 is a cross sectional view of another preferred specific embodiment of an armature of the valve of FIG. 1.

Figure 3:
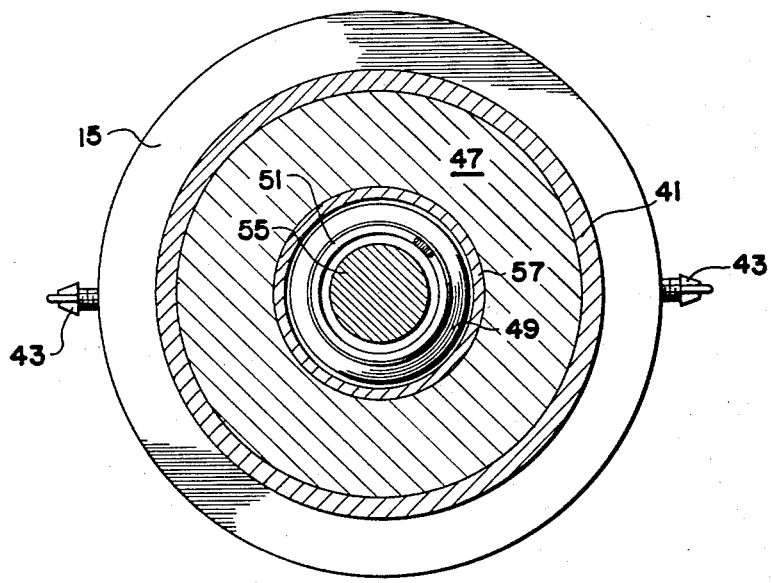
FIG. 3 is a view taken in cross section along line 3—3 of FIG. 1.
Figure 4:
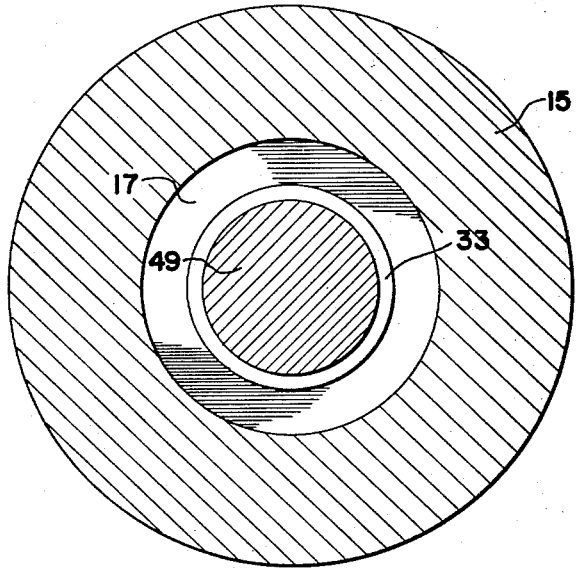
FIG. 4 is a cross sectional view taken along line 4—4 of FIG. 1.
Figure 5:
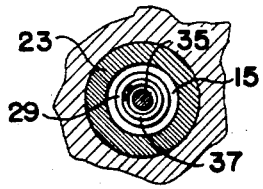
FIG. 5 is a view taken in cross section along line 5—5 of FIG. 1.
Figure 6:
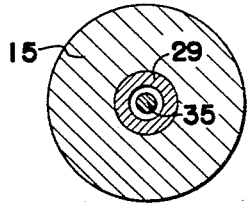
FIG. 6 is a view taken in cross section along line 6—6 of FIG. 1.

In the following is a discussion and description of the invention made with reference to the drawings whereon the same reference numerals are used to indicate the same or similar parts and/or structure. The discussion and description is of preferred specific embodiments of the new pressure release valve of our invention, and it is to be understood that the discussion and description is not to unduly limit the scope of the invention.

Referring now to the drawings in detail, FIGS. 1–6 show a preferred specific embodiment of our invention wherein a circular housing is depicted at 15. This housing 15 can be made of any suitable material such as metal, plastic or the like but preferably of cast aluminum. An upper portion of the housing 15 has a circular valve chamber 17. An axial hole 19 extends through the bottom portion of the housing 15 and communicates with the valve chamber 17. A transverse hole along a radius of the housing 15 intercommunicates with a top portion of the axial hole 19 and forms a fluid inlet duct 21 which intercommunicates with the valve chamber 17. A flange bushing 23 is mounted in the top portion of the duct 21 and projects into the valve chamber 17 with the top projecting portion of the flange bushing 23 forming a valve seat 25. A radial outlet duct 27 is in the side portion of the housing 15 and in communication with the valve chamber 17.

A hollow pressure adjusting screw 29 is threadedly mounted in the lower portion of the axial hole 19 between the inlet duct 21 and the bottom portion of the housing 15, and projecting through the bottom portion of the axial hole 19. A locking nut 31 is mounted on the screw 29 and is engageable with the bottom portion of the housing 15 to lock the adjusting screw 29 in place as desired. A disc-shaped valve 33 is engageably mounted on the valve seat 25 in the valve chamber 17. A valve stem 35 is rigidly mounted on the bottom portion of the valve 33 and projects downward from it through a portion of the inlet duct 21 and into the hollow portion of the adjusting screw 29. A helical valve spring 37 is mounted on the valve stem 35 in the vertical portion of the inlet duct 21 so that one end portion of the spring 37 engages a bottom portion of the valve 33 and the other end portion of the spring 37 engages the upwardly projecting end portion of the adjusting screw 29.

The upper inside portion of the housing 15 has an annular shoulder 39. A cylindrical solenoid housing 41 is mounted on the shoulder 39 by thumb screws 43 opposedly threadedly mounted in the top side portions of the housing 15 and projecting into the solenoid housing 41. A solenoid referred to generally at 45 is mounted in the solenoid housing 41 and has field coils 47 and an armature 49 operably mounted within the electrical field of the coils. A helical armature spring 51 is mounted in compression between the top inside portion of the solenoid housing 41 and the top portion of the armature 49. This spring 51 is held in place by a downwardly projecting boss 53 rigidly mounted on the top portion of the solenoid housing 41 and an upwardly projecting boss 55 on the top end portion of the armature 49. These bosses 53 and 55 and the armature 49 are preferably made of cast iron. A coil spool 57 preferably made of aluminum contains the field coils 47 in operating position relative to the armature 49.

A seal 59 is mounted in the solenoid housing 41 and slidably engages the armature 49 to seal fluids in the valve chamber 17 to prevent their leakage or escape into the solenoid 45. This seal can be of any suitable material but preferably of a neoprene O-ring. An inlet 61 is threadedly mounted in the outer portion of the inlet duct 21 and an outlet fitting 63 is similarly mounted in the outside portion of the outlet duct 27.

A semi-conductor rectifier referred to generally at 65 is connected to an electrical source of power (not shown). This rectifier 65 converts normal alternating current to direct current which allows the use of a smaller size field coil 47 by increasing the effectiveness of the field coils 47 when activated by direct current. The rectifier is electrically connected to the field coils 47 of the solenoid 45.

This rectifier of course is not necessary for the operation of the valve by means of the solenoid 45 but merely allows the use of a smaller coil. All embodiments of the valve herein can be equipped with a rectifier 65 if space problems make it particularly desirable to have a smaller solenoid coil 47 for the operation of the valve.

FIG. 2 shows a preferred specific embodiment of the valve wherein the armature 49 is replaced by a steel ball 67. In this embodiment the armature spring 51 urges the ball onto the valve 33 tending to hold the valve in place on its seat 25. The valve spring 51 is held in place by a similar boss 53 on the solenoid housing 41 with the depending portion of the spring 51 engaging the surface of the ball. In all other respects, the valve of this embodiment is similar to that of FIG. 1.

As can be readily seen, this embodiment of the valve of our invention is readily adjustable to operate as a relief valve at different pressures of fluid in the inlet duct 21. This variation of relief pressures is accomplished by adjusting the adjusting screw 29. As the adjusting screw 29 is turned so as to project its upward portion farther into the duct 21, the compression is increased on the spring 37 tending to lift the valve 33 against the downward compression pressure of the armature 49 and the armature spring 51. As a result less fluid pressure in duct 21 is required to lift the valve 33 from its seat 25. Conversely if the adjusting screw is retracted removing compression from the spring 37, fluid pressure in duct 21 must be sufficient to lift the valve 33 from its seat 25 against the full weight of armature 39 and compression pressure of armature spring 51.

In operation fluid under pressure is introduced through fitting 61 into duct 21 and around valve stem 35 and valve spring 37 and against the bottom portion of valve 33. If a pressure as pre-determined by adjustment of the adjusting screw 29 as hereinbefore described is not exceeded no fluid will pass through the valve. However, when desired the solenoid 45 is actuated. This may be actuated by manually operating an electrical switch, or by the electrical action of an automatic timing device, or the like which device (not shown) causes an electrical current to flow from a power source (not shown) into the rectifier 65 and the solenoid coils 47 causing the armature to lift against the compression pressure of the spring 51 which in turn allows the valve 33 to be lifted by the fluid pressure in duct 21 and the compression pressure of valve spring 37, allowing fluid under pressure to pass through the valve seat and into the valve chamber 17 and out through the outlet duct 27 and outlet fitting 63.

Figure 7:
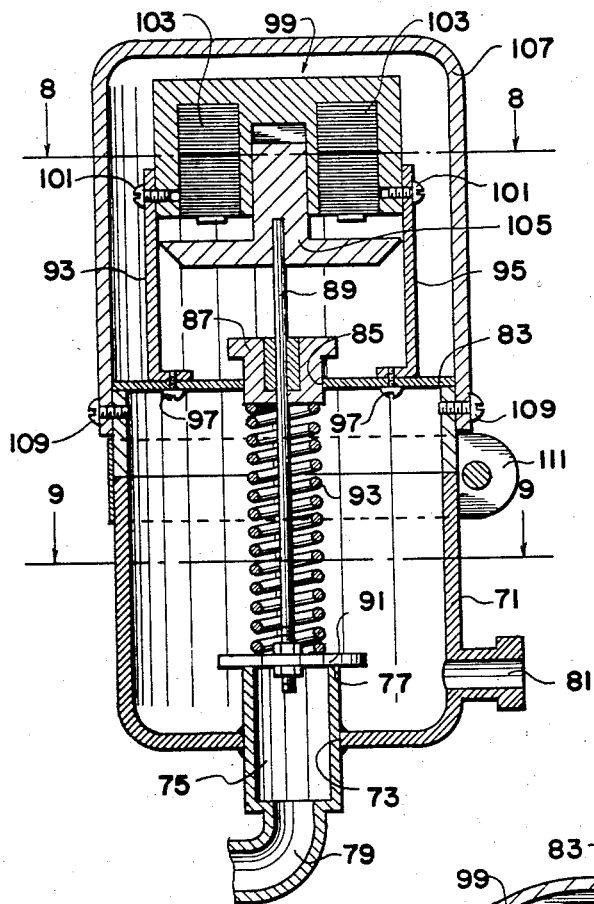
FIG. 7 is a side elevation view of another specific embodiment of the valve of our invention.
Figure 8:
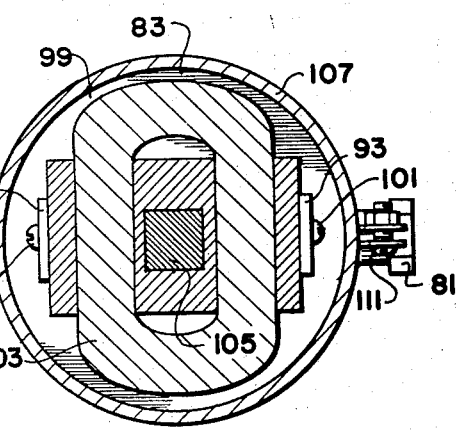
FIG. 8 is a cross sectional view taken along line 8—8 of FIG. 7.
Figure 9:
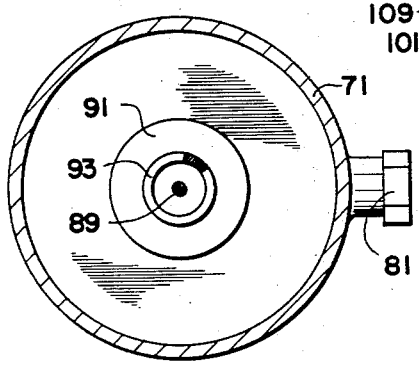
FIG. 9 is a cross sectional view taken along line 9—9 of FIG. 7.

Another preferred specific embodiment of our invention is depicted at FIGS. 7, 8 and 9. This valve has a generally cylindrical cup-like valve chamber 71 which has an axial hole 73 centered in the bottom portion. This chamber 71 can be made of any suitable material such as aluminum, steel, copper, plastic or the like but preferably of copper. An inlet bushing 75 is rigidly mounted in and through the hole 73 with the top end portion thereof projecting into the valve chamber 71 and forming a valve seat 77. An inlet duct 79 is rigidly mounted on the downwardly projecting end portion of the bushing 75. A transverse outlet duct 81 is rigidly mounted in a lower side portion of the valve chamber 71 and is in fluid communication with the valve chamber 71.

A disc 83 is rigidly mounted on the top end portion of the chamber 71 and seals the chamber 71 except for duct 81 and bushing 75. A valve stem hole 85 is centered in the disc 83 and a valve stem packing gland bushing 87 is rigidly mounted through the hole 85. A valve stem 89 is slidably mounted through the packing gland bushing 87 in a valve stem hole therein provided and projects therethrough. A disc-like valve 91 is adjustably and turnably mounted on the downwardly projecting end portion of the valve stem 89, in engaging relation with the valve seat 77. A helical valve spring 93 is mounted in compression on the valve stem 89. One end portion of the spring 93 engage the top portion of the valve 91 and the other end portion of the spring 93 engages the bottom portion of the bushing 87 so as to normally urge the valve 91 towards the valve seat 77.

Solenoid support brackets 95 are rigidly mounted preferably by screw means 97 on the top portion of the disc 83. A solenoid refered to generally at 99 is rigidly mounted by screw means 101 on the upwardly projecting end portions of the solenoid brackets 95. This solenoid 99 is substantially centered over the valve stem 89. The solenoid has field coils 103 and an armature 105 operably mounted within the electrical field of the coils 103, so as to be vertically movable when in operation. The upwardly projecting end portion of the valve stem 89 is rigidly mounted in a center bottom portion of the armature 105.

Not shown in this embodiment are electrical means for actuating the solenoid 99. However, similar means as those described in connection with the embodiment of FIG. 1 can be used in the operation of this embodiment.

A generally cylindrical cup-like housing cover 107 is removably mounted preferably by screw means 109 over and around the top end portion of the valve chamber 71. Means (not shown), are provided for the electrical means to be connected to the solenoid housed in the housing cover.

A mounting band 111 can be provided for mounting the valve.

The materials used in this embodiment are those commonly used in such devices. Preferably, the disc 83 is of copper and is preferably mounted on the chamber 71 by soldering, the housing cover is also preferably of copper, and the bushing 87, duct 81 and bushing 75 and duct 79 are preferably of bronze. Here again these bushings are preferably mounted by soldering means.

The operation of this valve is similar to the embodiment of FIG. 1. Fluid under pressure is passed through the duct 79 and bushing 75 against the bottom portion of the valve 91 and is there contained until such pressure exceeds the spring pressure of the valve spring 93 or the solenoid is actuated as hereinbefore described to lift the valve 91 from the seat 77 to allow the fluid under pressure to pass into the valve chamber 71 and out through the outlet duct 81. This pressure point is controlled by adjusting the valve 91 on the valve stem 89 by screw means to increase or decrease the compression pressure of the spring 93.

Figure 10:
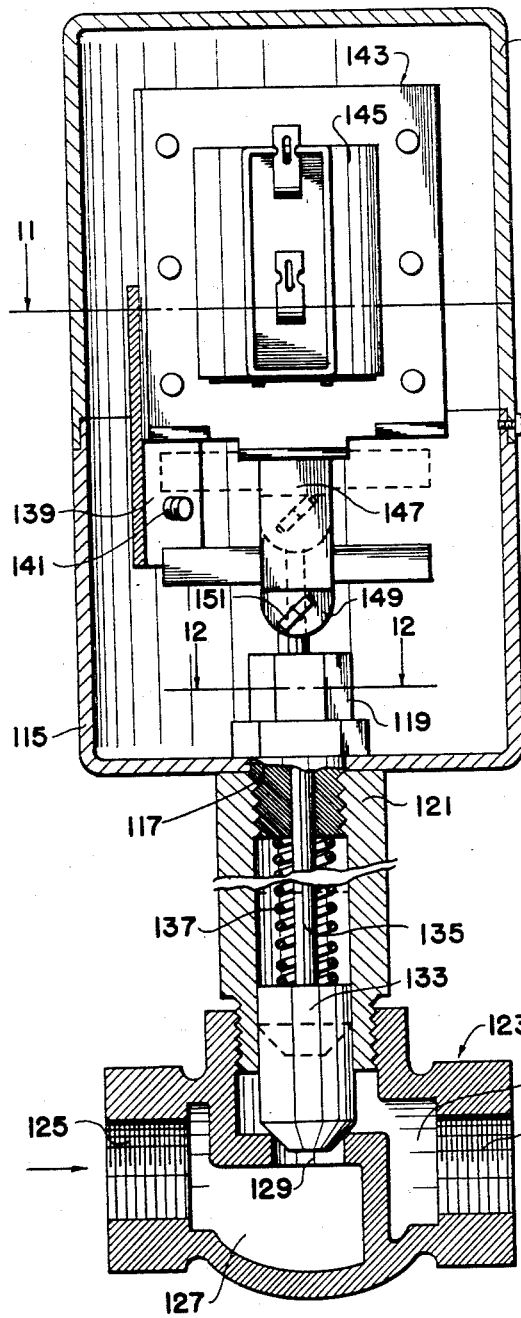
FIG. 10 is a side elevation view taken in cross section of yet another specific embodiment of the valve of our invention.
Figure 11:
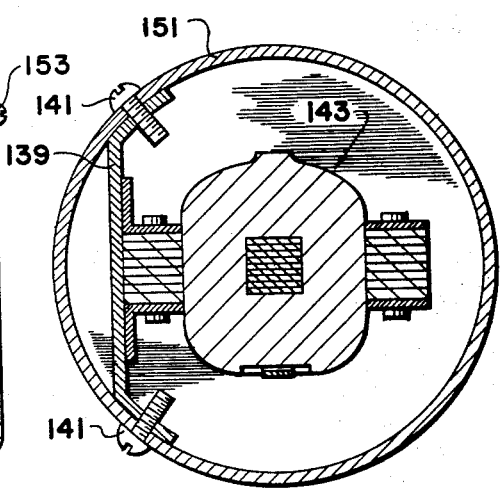
FIG. 11 is a view taken in cross section along line 11—11 of the FIG. 10.
Figure 12:
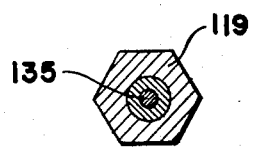
FIG. 12 is a view taken in cross section along line 12—12 of FIG. 10.

And still another preferred specific embodiment of our invention is depicted at FIGS. 10, 11 and 12. A generally cylindrical cup-like housing 115 has an axial hole 117 centered in its bottom portion. A packing gland bushing 119 is mounted in and projects through the hole 117. A pipe 121 is threadedly mounted on the downwardly projecting end portion of the bushing 119 with the upper end portion of the pipe 121 in close fitting engagement with the bottom portion of the housing 115 when so mounted. A T valve fitting referred to generally at 123 is threadedly mounted on the downwardly depending end portion of the pipe 21. A threaded inlet duct 125 intercommunicates with a fluid chamber 127 in which a horizontal valve seat 129 is mounted. A threaded outlet duct 131 is positioned in opposed relation to the inlet duct 125. The valve seat 129 is centered directly beneath the pipe 121. A valve 133 is slidably mounted in the inside portion of the pipe 121 and is engageable with the top portion of the valve seat 129. A valve stem 135 is rigidly mounted in the top end portion of the valve 133 and projects upwardly through the pipe 21 and into and through the packing gland bushing 119. A helical valve spring 137 is mounted on the valve stem 135 in compression and between the downwardly depending end portion of the bushing 119 and the top end portion of the valve 133 to in operation urge the valve 133 towards the valve seat 129. The packing gland of 119 engages the valve stem 135 in close fitting sliding engagement to effectively seal any fluids from escaping around the stem 135 into the housing 115. A bracket 139 is rigidly mounted by screw means 141 on an interior side portion of the housing 115. A solenoid generally referred to at 143 is rigidly mounted on the bracket 139 and is centered above the upwardly projecting valve stem 135. The solenoid has field coils 145 and an armature 147 that is operably vertically movable within the electrical field of the coils 145. The armature has a depending portion 149 which is preferably mounted by key means 151 on the upwardly projecting end portion of the valve stem 135.

The materials used in the construction of this embodiment are again those common to the art. The fitting 123 is preferably bronze, the pipe 121 is preferably of brass as is the bushing 119. The packing contained in the gland of 119 is preferably of neoprene O-rings. The valve 133 is also preferably made of neoprene and of such size that it is in close fitting sliding engagement with the interior walls of the pipe 121. The solenoid here again is made of component parts well known and common to the art. The housing 115 is preferably made of copper and a housing cover 151 which covers the solenoid is also preferably made of copper. Screw means 153 can be provided to hold the cover 151 on the housing 115.

The operation of this valve is similar to the others. The fluid entering through duct 125 under pressure passes into the fluid chamber 127 exerting a pressure against the bottom of the valve 133 which is being held in place by the compression pressure of the spring 137. This spring pressure can be altered by use of different size springs or by the introduction of spacer washers (not shown) between the top end portion of the fitting 123 and a bottom portion of pipe 21 immediately above the threads thereon. Similar electrical means as described in connection with the embodiment on FIG. 1 can be used with this version of our valve.

As can be readily ascertained from the foregoing, all embodiments of our valve basically perform the same function, that is, to provide a combination pressure regulating, safety and unloading valve for use in connection with a pressure vessel of a vacuum system. It is noted that the embodiment of FIG. 10 is particularly suitable for easy cleaning by merely unscrewing the pipe 121 from the fitting 123 but also tends to be self cleaning because of the use of a close fitting valve of neoprene seating against a bronze seat.

In practice, we have found that all three embodiments of our new valve are particularly adapted for use with a deep fat or oil food cooking machine. The combination of features in the valve of our invention is quite advantageous economically in that we have provided one valve that performs the same functions that heretofore have required the use of two or more valves.

The foregoing discussion and description has been made in connection with preferred specific embodiments of the new pressure release valve of our invention. However, it is to be understood that the discussion and description is only intended to illustrate and teach those skilled in the art how to practice the invention, and such is not to unduly limit the scope of the invention, which is defined in the claims set forth hereinafter.

We claim:

1. A pressure release valve comprising, a cylindrical housing having a cylindrical valve chamber in the top portion thereof, an axial hole through said housing, a transverse hole along a radius of said housing intercommunicating with a top portion of said axial hole, said transverse hole and said top portion of said axial hole forming a fluid inlet duct intercommunicating with said valve chamber, said top portion of said axial hole forming a vertical portion of said inlet duct, a flange bushing mounted in the top portions of said duct and projecting into said valve chamber, said projecting portion of said flange bushing forming a valve seat, a radial outlet duct through a side portion of said housing and intercommunicating with said valve chamber, a hollow pressure adjusting screw threadedly mounted in a lower portion of said axial hole and between said inlet duct and the lower end portion of said housing and projectable into said vertical duct portion, a valve engageably mounted on said valve seat for coaction therewith, a valve stem rigidly mounted on said valve and projecting downwardly through the axial portion of said inlet duct and into the hollow portion of the said pressure adjusting screw, and a helical valve spring mounted on said valve stem in the vertical portion of said inlet duct and one end portion thereof engaging a bottom portion of said valve, and the other end portion of said spring engaging the upwardly projecting end portion of said pressure adjusting screw, an annular shoulder in the top inside portion of said housing, a solenoid housing mounted in said cylindrical housing and on said shoulder by screw means, a solenoid mounted in said solenoid housing having field coils, an armature operably mounted in the electrical field of said coils and engaging the top portion of said valve, a helical armature spring in compression engageably mounted between said armature and the top inside portion of said solenoid housing, a boss rigidly mounted on said top inside portion of said solenoid housing and projecting into said helical armature spring, another boss mounted on the top portion of said armature and projecting into said helical armature spring, an inlet fitting threadedly mounted in said inlet duct, and an outlet fitting threadedly mounted in said outlet duct, an electrical rectifier mounted on said solenoid housing, said rectifier electrically and operably connected between said solenoid and an electrical power source, said valve constructed and adapted to pass fluid under pressure in and through said inlet duct, through said flange bushing and against said valve, said valve tending to be held on said valve seat by the said armature and the compression pressure of the said armature spring, and said valve tending to be lifted from said valve seat by the variable compression pressure of said valve spring and the pressure of said fluid in said inlet duct, said electric power source passing electric current through said rectifier and through said field coils to lift said armature against the compression of the said armature spring allowing said valve to lift and said fluid to pass through said valve seat, into and through said valve chamber and out through said outlet duct.

2. A pressure release valve comprising, a cylindrical housing having a cylindrical valve chamber, an axial hole through said housing and communicating with said chamber, a transverse inlet duct intercommunicating with said hole, a transverse outlet duct intercommunicating with said chamber, a valve seat mounted in the top portion of said hole, a projecting hollow adjusting screw threadedly mounted in said hole, a valve mounted in said chamber for coaction with said valve seat, said valve having a valve stem portion projecting into said axial hole, a valve spring mounted on said valve stem adjustably in compression between said screw and said valve, a solenoid mounted on said housing having an armature engaging the said valve and an armature spring in compression engaging said armature and a portion of said solenoid, electrical means connecting said solenoid to an electric power source, said valve constructed and adapted to pass fluid under pressure through same by passing an electric current from said electric power source through said electrical means and solenoid, lifting said armature and allowing said valve to be raised.

3. A pressure release valve, comprising, a housing having a central valve chamber, a hole through said housing and communicating with said chamber, an inlet duct intercommunicating with said hole, an outlet duct intercommunicating with said chamber, a valve seat mounted in an upper portion of said hole, an adjusting screw mounted in said hole, a valve mounted on said valve seat for coaction with said seat, said valve having a stem projecting into said hole, a compression means mounted on said stem and compressed between said screw and said valve to bias said valve toward an open position, a solenoid mounted on said housing having an armature engaging said valve and a spring engaging said armature to bias said valve toward a closed position, means connecting said solenoid to a power source, said valve to pas fluid under pressure through same on passing an electric current from said power source through said solenoid to lift said armature and allowing said valve to be raised by said compression means, and said screw adjustable within said hole to regulate the biasing of said compression means and thereby regulating the pressure at which said valve will open as a safety means.

4. A pressure release valve, comprising: a housing having a valve chamber, a hole through said housing and communicating with said chamber, an inlet duct intercommunicating with said hole, an outlet duct intercommunicating with said chamber, a valve seat mounted in said chamber connected to said inlet duct, an adjusting screw mounted in said hole, a valve mounted on said valve seat, a compression means mounted in said hole between said screw and said valve, a solenoid mounted on said housing having an armature engaging said valve and a spring in compresion engaging said armature, means connecting said solenoid to a power source, said valve to pass fluid under pressure through same on passing an electric current from said power source through said solenoid lifting said armature and allowing said valve to be raised by said compression means, and said screw adjustable within said hole to regulate the biasing of said compression means and thereby providing means for regulating the pressure at which said valve will open as a safety means.

References Cited

UNITED STATES PATENTS

| | | | |
|---|---|---|---|
| 3,091,394 | 5/1963 | Sparrow | 251—11 X |
| 3,247,912 | 4/1966 | Reynolds | 251—129 X |
| 3,332,445 | 7/1967 | Allen | 251—130 X |
| 1,087,890 | 2/1914 | Rogers | 137—529 X |
| 1,902,027 | 2/1933 | Henkel | 251—129 |
| 2,283,903 | 5/1942 | Ashcraft | 251—141 X |
| 2,459,689 | 1/1949 | Dickey et al. | 137—522 X |
| 2,502,591 | 4/1950 | Ray | 251—141 X |
| 3,082,359 | 3/1963 | Mangiafico et al. | 251—141 X |
| 3,269,689 | 8/1966 | Lee | 251—129 X |

FOREIGN PATENTS 680,501 2/1964 Canada.

WILLIAM F. O'DEA, *Primary Examiner.*

DAVID J. ZOBKIW, *Assistant Examiner.*

U.S. Cl. X.R.

137—529, 539.5, 540; 251—129, 130